United States Patent
Vickers et al.

(10) Patent No.: US 7,857,237 B2
(45) Date of Patent: Dec. 28, 2010

(54) SPRAYER DOCKING STATION AND MONITORING SYSTEM

(75) Inventors: Michael T. Vickers, Charlotte, NC (US); Steve A. Junge, Johnston, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/212,955

(22) Filed: Sep. 18, 2008

(65) Prior Publication Data

US 2009/0039172 A1    Feb. 12, 2009

Related U.S. Application Data

(63) Continuation of application No. 10/284,002, filed on Oct. 30, 2002, now Pat. No. 7,503,510.

(51) Int. Cl.
*A01G 27/00*    (2006.01)

(52) U.S. Cl. .......................... 239/69; 239/71; 239/148; 141/18; 141/94; 141/231; 141/383; 222/52; 222/129

(58) Field of Classification Search .............. 239/69.71, 239/148, 167, 168, 172; 141/1, 2, 18, 94, 141/98, 206, 207, 231, 283, 383, 386; 222/52, 222/53, 129, 544
See application file for complete search history.

(56) References Cited

U.S. PATENT DOCUMENTS

| | | | |
|---|---|---|---|
| 3,612,356 A | 10/1971 | McVey | |
| 3,976,087 A | 8/1976 | Bolton et al. | |
| 4,030,244 A | 6/1977 | Tennes et al. | |
| 4,197,995 A | 4/1980 | Campbell et al. | |
| 4,244,522 A | 1/1981 | Hartwig | |
| 4,264,023 A | 4/1981 | Stocks et al. | |
| 4,358,054 A | 11/1982 | Ehrat | |
| 4,467,961 A * | 8/1984 | Coffee et al. | 239/1 |
| 4,673,130 A | 6/1987 | Simpson | |
| 4,677,787 A | 7/1987 | Said | |
| 4,738,463 A | 4/1988 | Poore et al. | |
| 4,805,088 A | 2/1989 | Cross et al. | |
| 5,131,438 A | 7/1992 | Loucks | |
| 5,242,120 A | 9/1993 | Barber et al. | |
| 5,516,044 A * | 5/1996 | Thorstensson | 239/159 |
| 5,754,137 A | 5/1998 | Durrstein | |
| 5,884,224 A | 3/1999 | McNabb et al. | |

(Continued)

FOREIGN PATENT DOCUMENTS

EP    0197026    6/1987

(Continued)

*Primary Examiner*—Tu M Nguyen

(57) ABSTRACT

The improved sprayer system of the present invention utilizes a docking drogue and probe assembly to quickly and easily allow refilling of the sprayer tanks with a material from an enlarged nurse tank. The coupling of the drogue and probe allows for fluid communication, as well as electronic transmission of material data to a processor in the prime mover. This processor software also receives input regarding field data and crop data, as well as feedback data from the sprayer regarding the material application. A GPS system on the prime mover allows for tracking the spraying operation, while a time stamp in the processor software tracks the timing of the spraying operation. This system thus allows for accurate accountability and traceability for the use of materials during the spraying operation.

6 Claims, 2 Drawing Sheets

U.S. PATENT DOCUMENTS

| | | |
|---|---|---|
| 6,089,743 A | 7/2000 | McQuinn |
| 6,510,367 B1 | 1/2003 | McQuinn |
| 6,622,935 B1 * | 9/2003 | Owens et al. ............... 239/77 |
| 6,708,631 B1 | 3/2004 | McQuinn et al. |
| 7,086,342 B2 * | 8/2006 | O'Neall et al. ............ 111/174 |
| 7,418,908 B2 * | 9/2008 | Landphair et al. ......... 111/175 |
| 7,440,831 B2 * | 10/2008 | Miedema et al. ........... 701/50 |
| 2002/0030119 A1 | 3/2002 | Proharam |

FOREIGN PATENT DOCUMENTS

| | | |
|---|---|---|
| EP | 0472860 | 4/1992 |
| EP | 0576121 | 12/1993 |
| EP | 0676123 | 10/1995 |
| EP | 0843958 | 5/1998 |
| EP | 0916245 | 5/1999 |

* cited by examiner

SPRAYER DOCKING STATION AND MONITORING SYSTEM

CROSS REFERENCE TO A RELATED APPLICATION

This application is a continuation of application Ser. No. 10/284,002 filed Oct. 30, 2002 now U.S. Pat. No. 7,503,510.

BACKGROUND OF THE INVENTION

Field of the Invention

Conventional sprayers, such as agricultural sprayers, typically carry one or more tanks for storing water or chemical solutions. A spray bar having multiple sprayer heads is associated with the tanks for spraying, for example chemicals onto the crop in a field. When the sprayer tank is empty, the operator must drive back to the primary or nurse tank to refill the sprayer tank, and then return to the field to resume the spraying operation approximately where it was last interrupted. Generally, due to field size, it requires multiple sprayer tank fills to complete the spraying application for a given field. The refilling of the sprayer tank is a time consuming, manual process conducted by the sprayer operator using pumps, hoses, and judgment as to the needed amount of chemical solution and mix ratio. The time required to fill the sprayer tank significantly reduces the productivity of the machine.

The operator must use judgment to determine the volume of chemicals to be put into the sprayer tank, since residual chemicals in the sprayer tank must be dealt with after the spraying operation in the field is completed. To determine the amount, the operator must know or estimate the amount of area which must still be sprayed and then accurately measure the amount of water and chemicals to transfer to the sprayer. The operator also must use care to mix the proper ratio of chemicals to water in order to achieve the optimum spraying results. A mix concentration that is lower than recommended by the chemical label will result in poor pest control whereas, a mix that is too high in concentration can result in crop or environmental damage. The mixing of the chemical is generally done by pouring the chemical into the top of the sprayer tank or into an induction device located on the sprayer or on the nurse tank which mixes the chemical into the water stream as the sprayer tank is filled. The operator may be subjected to chemical exposure during the refilling process. Also, chemical spills may occur during the refilling process, thereby contaminating the ground or the spraying equipment.

Recording of the chemicals used is also a function of the operator, who must input data at the end of the spraying operation regarding the amount of chemicals used and the areas covered. This is also a time consuming process which often is ignored or overlooked, due to time constraints.

Therefore, a primary objective of the present invention is the provision of an improved material handling and loading system for sprayers.

Another objective of the present invention is the provision of a docking system which will allow the transfer of materials and data between a primary or nurse tank and a sprayer tank to refill the tank without manual intervention.

Another objective of the present invention is the provision of means and a method to electronically communicate data between the primary or nurse tank and the sprayer, in order to control and record the loading process of the sprayer.

Another objective of the present invention is the provision of a spraying system that utilizes a computer processor and associated software for receiving and storing data regard loading of the sprayer.

Another objective of the present invention is the provision to electronically trace the movement of the spray chemical in order to totally account for the chemical from its original container to its final application location.

These and other objectives will become apparent from the following description of the invention.

BRIEF SUMMARY OF THE INVENTION

Figure 1:
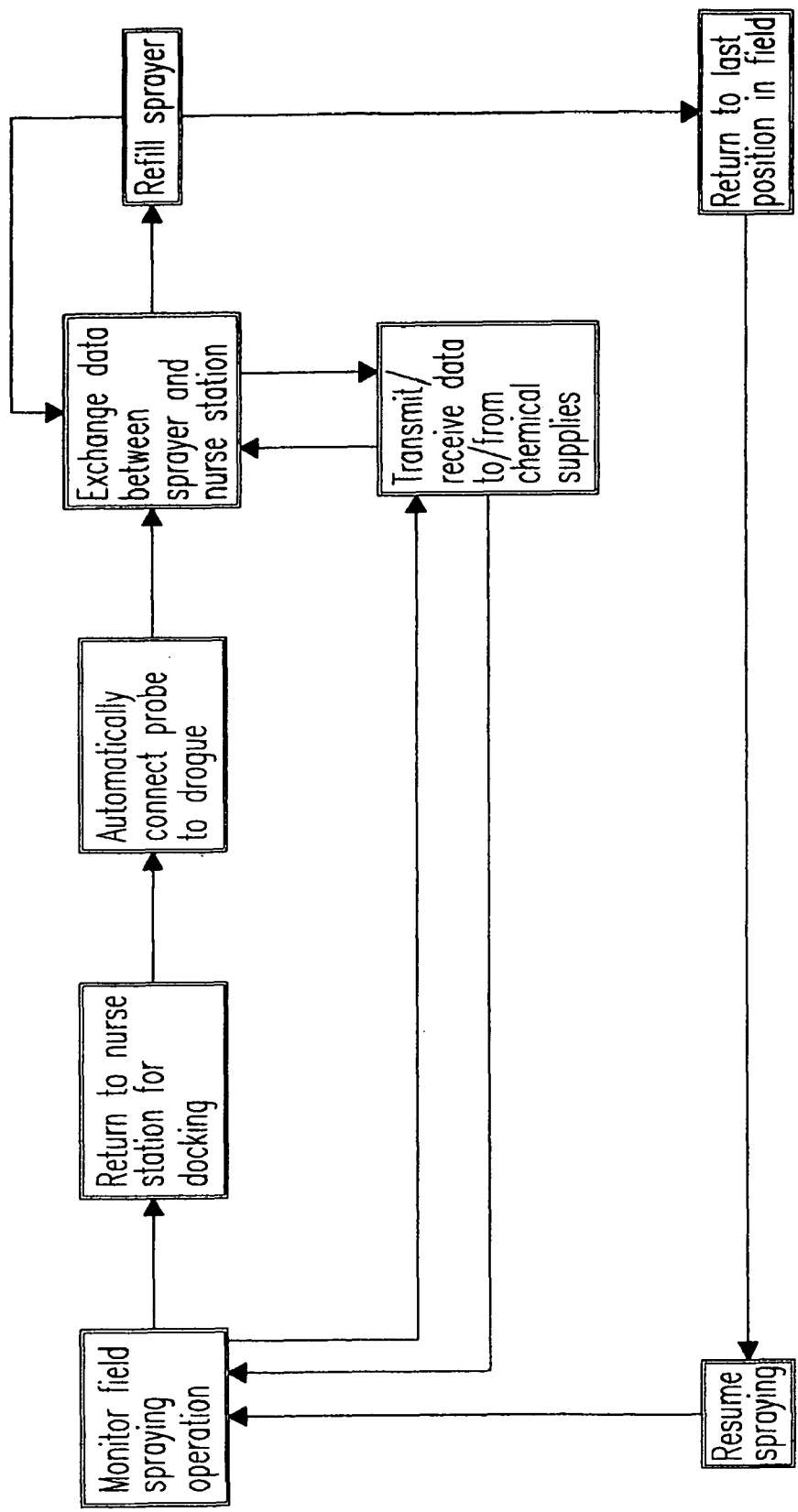
FIG. 1 is a schematic flow chart of the improved spraying method of the present invention.
Figure 2:
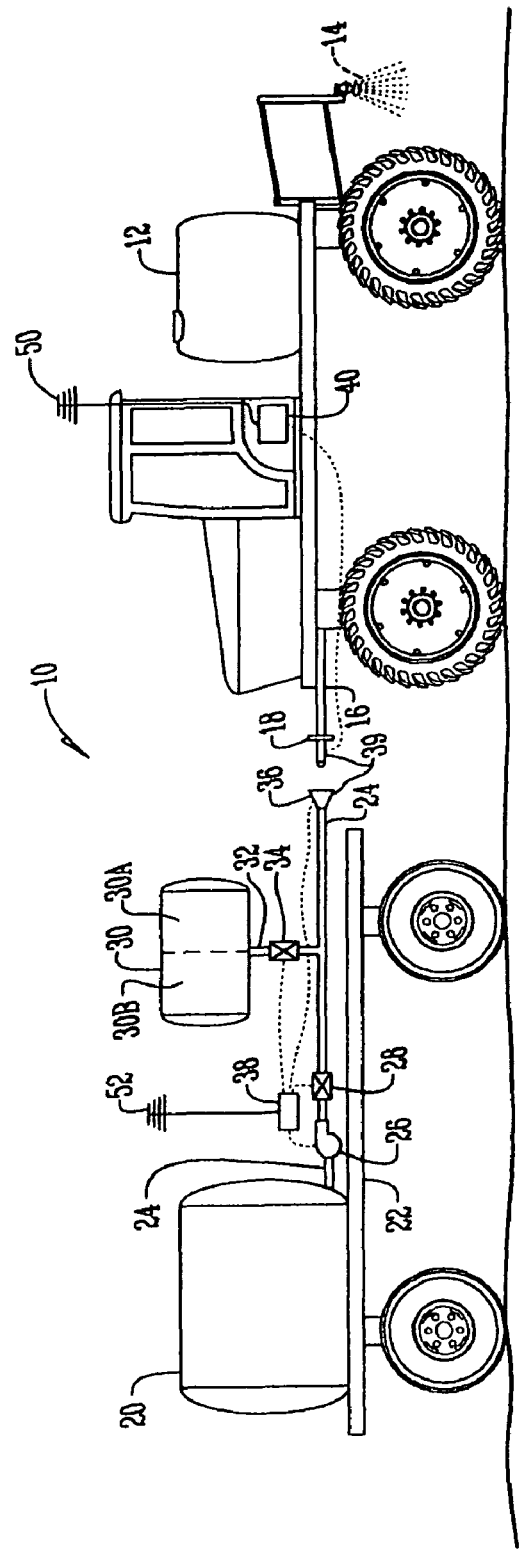
FIG. 2 is a schematic side elevation view showing the drogue and probe assembly of the present invention used to fill the sprayer tank from a nurse tank.

The improved spraying system of the present invention utilizes a sprayer for spraying materials from a sprayer tank onto a target area, such as crop in a field. The sprayer may be pulled by a tractor or other vehicle, or may be self propelled. The material to be sprayed may be a liquid such as a chemical solution, a solid such as fertilizer, or a gas such as ammonia. The system includes a data sensor and transmitter on the sprayer to transmit sprayer data to a computer or processor on the machine or another remote location. The processor includes software for receiving and $_5$oring the sprayer data, as well as initial input data concerning the crop, the field, and the chemicals being used. This system also includes a global positioning device for tracking the location of the spraying operation. The software includes a time stamp for time stamping the spraying data. Thus, accountability and traceability of the use of the chemicals is automatically obtained.

The improved sprayer system also includes a drogue on the sprayer or tractor for coupling with a probe on the primary chemical storage or nurse tank. Upon coupling of the drogue and probe, the sprayer tank can be automatically refilled with chemicals from the nurse tank, without manually connecting hoses or activating pumps. This unmanned refilling process avoids chemical spills and exposure to the chemicals by the operator. In addition to fluid communications, the coupled drogue and probe provide electronic communication for automatically inputting information to the processor regarding the refilling process. Other material information can also be communicated between the sprayer and the nurse tank. Navigation structure can be provided for guidance purposes for locating the sprayer relative to the nurse tank and sprayer relative to the crop. In a further embodiment, a direct trailer to sprayer wireless also can be used.

DETAILED DESCRIPTION OF THE INVENTION

The improved sprayer system of the present invention includes a self-propelled sprayer 10 with one or more material tanks 12 and one or more spray nozzles 14 in connection with each tank 12. The sprayer also may be towed by a tractor. The sprayer 10 includes a pump (not shown) which can be actuated to cause material in the tank 12 to be sprayed by the nozzles 14 onto a crop in the field.

The sprayer 10 includes a hose 16 for each tank 12 which is in fluid communication with a probe 18 extending forwardly from the sprayer 10. It is understood that the probe 18 may also extend rearwardly from the sprayer to allow for easy coupling, as discussed below.

A large primary storage or nurse tank 20 is provided for filling the tank 12 of the sprayer 10. The nurse tank 20 is mounted on a trailer 22, but it is understood that the nurse tank 20 may also be stationary on the ground or on some other vehicle. A fluid line 24 leads from the nurse tank 20 to a pump 26. The pump 26 pumps water or a chemical solution via hose 24 through a flow meter 28 and to drogue 36, which is adapted to receive and couple to the probe 18. The drogue and probe assembly is similar to an in-flight refueling system for aircraft. It is understood that the probe and drogue may be reversed in respect to the sprayer and nurse tank if it is convenient to do so. Other automatic coupling devices may also be used. Thus, when the drogue 36 and probe 18 are coupled, water or a chemical solution in the nurse tank 20 can be pumped by a pump 26 or otherwise supplied to the tanks 12 on the sprayer 10 while being precisely measured by flow meter 28. Coupling of the probe 18 and drogue 36 is quickly and easily achieved by relative motion between the structures, such as by extending the probe 18 and/or driving the sprayer 10 forwardly. The enlarged open end of the drogue 36 provides for easy alignment with the probe 18. The probe 18 can be extended from and retracted to the sprayer in any convenient manner.

A chemical storage tank 30 is also located on the trailer 22. The chemical storage tank may be fixed or preferably easily detachable so as to accommodate the easy replacement of chemical storage tanks. The chemical storage tank 30 is connected via hose 32 to hose 24. This allows chemical to be fed into hose 24 by way of flow meter 34 allowing precise measurement of the flow of chemical. It is understood that multiple chemical storage tanks such as shown at 30a and 30b may be included in the system.

The drogue 36 and probe 18 also include electrical connections 39 such that upon coupling of the drogue and probe, data related to the filling operation, including, but not limited to the volume and type of material supplied from the nurse tank 20 and the chemical tank 30 (or tanks 30a, 30b) to the sprayer tanks 12 can automatically be shared by sprayer data processor 40 and the data processor 38 on the nurse trailer 22. Additional data can be input or transmitted to the sprayer processor 40 and the nurse trailer processor 38, such as the site and size of the field to be sprayed, the type of crop planted in the field, and spraying operation data. Such data can include information on material type and use requirements to predict sprayer and nurse tank refilling needs so that advanced notice can be provided to the operator and/or to the material supplier. The global positioning systems 50 and 52 can be or include a direct trailer to sprayer wireless communication link to eliminate any need for the electrical contacts 39 in the drogue and probe and to provide, a direct communication link between the trailer and the sprayer during spraying operations. Auto-guidance of the sprayer 10 and/or the mating coupling components 18 and 36 can also be provided by the processors 38 and 40 during the docking function.

The input means for the crop, field, material and spraying operation data, as well as the GPS data, includes convention sensing and transmission devices, both manual and automatic. Thus, the operator can manually enter the crop, field, and material data into the processor while the spraying and GPS data is automatically input into the processor 40. The sprayer 10 also may be equipped with a global positioning device 50 operatively connected to the processor 40 so that the location of the sprayer 10 can be continuously and accurately monitored. The nurse tank 20 may also be provided with a global positioning system, as indicated by reference numeral 52 in FIG. 1. The nurse trailer processor 38 is also operatively connected to the processor 40, via the electrical connections 39 in the drogue 36 and probe 18.

In operation, the self-propelled sprayer 10 follows the steps generally outlined in FIG. 1. Specifically, the field data, crop data, and chemical application data are entered or recorded into either the sprayer processor 40 or nurse tank processor 38, as selected by the operator. The chemical application data may include the type of chemical, the mix ratio, and the target application rate for the job. The drogue 36 and probe 18 are coupled automatically as the sprayer moves toward the nurse trailer. The processors 38 and 40 calculate the correct volume of materials necessary such as chemicals and water required for the application. By monitoring the flow meters 28 and 34 and controlling the pump 26 and various valves (not shown), the precise amount is transferred to the sprayer tank 12. An electronic record of the transferred amounts can be stored in the processors 38 and 40. The sprayer 10 can then move away from the nurse trailer 22 with the probe 18 and drogue 36 automatically disconnecting. The entire filling operation can be accomplished without the sprayer operator leaving the cab of the sprayer and without any other support person with the nurse trailer 22. The spray pumps are actuated and the sprayer 10 traverses the field in a conventional manner, while the GPS 50 automatically tracks the spraying operation and the spraying data is automatically transmitted to the processor 40 for recording. The material application rate may vary over the field in response to the input data provided to the processor 40. When the tank 12 approaches a refill condition, the system will generate a visible and/or audible signal so that the operator can return to the nurse station for refilling the tank 12. The GPS 50 allows the operator to know exactly where to return to restart the spraying operation, without overlapping the material application and without missing a portion of the field to be sprayed. The GPS system may also allow for an unmanned spraying operation wherein the tractor traverses the field without an operator.

The nurse tank 20 may also include a prime mover and a navigation system (not shown) coupled to the GPS 52 and in communication with the navigation system on the sprayer 10 so that in the un-manned mode, the nurse tank will be guided to a precise refill location dependant on refill needs of the sprayer and on other considerations, such as field or crop conditions. The nurse tank can also communicate with a main base station or material supply company regarding nurse tank refill needs.

The software of the processor 40 also includes a time stamp, so that the time of application of the materials to any particular area in the field can be recorded.

Thus, the operator can use precision farming methods to provide accurate and detailed information regarding the type of material desired, the mix ratio, the field size, the area covered, the position where material application was terminated, and refill of the sprayer tanks, all from the driver's seat in the sprayer 10. This system provides more efficiency, reduced contamination of the environment, equipment and personnel, precise measurements, reduced losses, and the capability for multiple material applications. The system also provides an advance notice for refilling of the sprayer by the operator and of the nurse tank by the operator or material supply company, as well as a convenient planning and material tracking tool.

Thus, the improved sprayer system of the present invention yields increased productivity and decreased hazards in the application of materials to a crop in a field and other locations.

Whereas the invention has been shown and described in connection with the preferred embodiment thereof, it will be understood that any modifications, substitutions, and additions may be made which are within the intended broad scope of the following claims. From the foregoing, it can be seen that the present invention accomplishes at least all of the stated objectives.

What is claimed is:

1. A method of monitoring spraying of a material by a sprayer onto crops in a field, comprising the steps of:
   inputting field, crop and material data into a computer;
   spraying the field;
   refilling the sprayer with material, the step of refilling including automatically coupling a nurse tank to the sprayer;
   during the step of refilling, automatically recording data regarding material flow to and from the sprayer into the computer; and
   auto-guiding the sprayer with a processor when coupling the nurse tank to the sprayer as the sprayer moves toward the nurse tank.

2. The method of claim 1 further comprising the steps of providing a nurse tank processor, and communicating data between the nurse tank processor and the computer during the step of refilling.

3. The method of claim 2 further including the step of automatically connecting the processor and the computer.

4. The method of claim 1 further comprising tracking the location of the spraying operation and, after the step of refilling the sprayer, guiding the sprayer to a location where spraying was stopped for the step of refilling.

5. The method of claim 4 further comprising coordinating the tracking and recording functions.

6. The method of claim 5 further comprising time stamping the recorded spraying data.

\* \* \* \* \*